US012793373B2

(12) United States Patent
Yu et al.

(10) Patent No.: US 12,793,373 B2
(45) Date of Patent: Nov. 10, 2026

(54) METHOD AND APPARATUS FOR PROCESSING VIDEO IMAGE, ELECTRONIC DEVICE, AND STORAGE MEDIUM

(71) Applicant: Beijing Zitiao Network Technology Co., Ltd., Beijing (CN)

(72) Inventors: Yubin Yu, Beijing (CN); Dayu Qiu, Beijing (CN); Ruchong Luo, Beijing (CN); Huilin Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 217 days.

(21) Appl. No.: 18/741,247

(22) Filed: Jun. 12, 2024

(65) Prior Publication Data

US 2024/0331341 A1 Oct. 3, 2024

Related U.S. Application Data

(63) Continuation of application No. PCT/CN2022/136744, filed on Dec. 6, 2022.

(30) Foreign Application Priority Data

Dec. 13, 2021 (CN) ........................ 202111522826.0

(51) Int. Cl.
*G06V 10/25* (2022.01)
*G06T 7/60* (2017.01)
(Continued)

(52) U.S. Cl.
CPC ................ *G06V 10/25* (2022.01); *G06T 7/60* (2013.01); *G06T 7/73* (2017.01); *G06V 10/44* (2022.01)

(58) Field of Classification Search
CPC .......... G06V 10/25; G06V 10/44; G06T 7/73; G06T 7/60
See application file for complete search history.

(56) References Cited

U.S. PATENT DOCUMENTS

2012/0084646 A1 4/2012 Homma et al.
2015/0077421 A1 3/2015 Lehtiniemi et al.
(Continued)

FOREIGN PATENT DOCUMENTS

CN 104967893 A 10/2015
CN 110168599 A 8/2019
(Continued)

OTHER PUBLICATIONS

International Patent Application No. PCT/CN2022/136744; Int'l Written Opinion and Search Report; dated Feb. 9, 2023; 8 pages.
(Continued)

*Primary Examiner* — David Perlman
(74) *Attorney, Agent, or Firm* — BakerHostetler

(57) ABSTRACT

The present disclosure provides a method and an apparatus for processing a video image, an electronic device, and a non-transitory computer readable storage medium. The method for processing a video image includes: determining attribute information of an object to be processed in a video frame to be processed; determining datum display information of the object based on the attribute information of the object; and adjusting, based on the datum display information, target display information of a mounted material in the video frame to be processed, to obtain a processed video frame corresponding to the video frame to be processed.

15 Claims, 3 Drawing Sheets

(51) Int. Cl.
*G06T 7/73* (2017.01)
*G06V 10/44* (2022.01)

(56) References Cited

U.S. PATENT DOCUMENTS

| | | | | |
|---|---|---|---|---|
| 2015/0248198 | A1* | 9/2015 | Somlai-Fisher | G06F 3/0481 715/716 |
| 2018/0308276 | A1 | 10/2018 | Cohen et al. | |
| 2019/0172251 | A1 | 6/2019 | Plescia et al. | |
| 2019/0197755 | A1 | 6/2019 | Vats | |
| 2020/0258313 | A1* | 8/2020 | Chen | G06T 7/73 |
| 2021/0304452 | A1* | 9/2021 | Lee | H04L 51/10 |
| 2021/0334547 | A1* | 10/2021 | Cohen-Tidhar | G06V 10/82 |
| 2022/0172478 | A1* | 6/2022 | Sun | G06V 20/48 |
| 2023/0162448 | A1* | 5/2023 | Alamdar | A63F 13/65 463/31 |

FOREIGN PATENT DOCUMENTS

| | | | |
|---|---|---|---|
| CN | 111105483 | A | 5/2020 |
| CN | 111243049 | A | 6/2020 |
| CN | 111754613 | A | 10/2020 |
| CN | 111815656 | A | 10/2020 |
| CN | 112598569 | A | 4/2021 |
| CN | 112604279 | A | 4/2021 |
| CN | 112652038 | A | 4/2021 |
| CN | 113490050 | A | 10/2021 |
| CN | 113518256 | A | 10/2021 |
| CN | 114202617 | A | 3/2022 |
| JP | 2004056358 | A | 2/2004 |
| JP | 2018022995 | A | 2/2018 |
| WO | 2019205016 | A1 | 10/2019 |

OTHER PUBLICATIONS

First Office Action for Chinese Application No. 202111522826.0, mailed Oct. 22, 2024, 18 pages.

* cited by examiner

METHOD AND APPARATUS FOR PROCESSING VIDEO IMAGE, ELECTRONIC DEVICE, AND STORAGE MEDIUM

CROSS-REFERENCE TO RELATED APPLICATION(S)

The present application is a Continuation Application of International Patent Application No. PCT/CN2022/136744, filed Dec. 6, 2022, which claims priority to Chinese Patent Application No. 202111522826.0 filed Dec. 13, 2021, the disclosures of which are incorporated herein by reference in their entities.

FIELD

The present disclosure relates to the technical field of image processing, and relates to, for example, a method and an apparatus for processing a video image, an electronic device, and a storage medium.

BACKGROUND

Along with popularization of short videos, increasing users will shoot videos with terminal devices, and add effects to themselves in the videos for making their videos fun.

In an application scenario, the added effects can be located with corresponding key limb points, which are mostly determined through a two-dimensional (2D) or three-dimensional (3D) algorithm. The 3D algorithm is demanding in terms of device performance as it is performance-consuming when used to determine the key limb points. Compared with the 3D algorithm, the 2D algorithm is lower in performance consumption and higher in accuracy of determined key body points. However, it is likely to cause a poor effect follow-through result since its incapacity to obtain three-dimensional information of the key limb point.

SUMMARY

The present disclosure provides a method and an apparatus for processing a video image, an electronic device, and a non-transitory computer readable storage medium, so as to implement three-dimensional display of a mounted material.

In a first aspect, the present disclosure provides a method for processing a video image. The method includes: determining attribute information of an object to be processed in a video frame to be processed; determining datum display information of the object based on the attribute information of the object; and adjusting, based on the datum display information, target display information of a mounted material in the video frame to be processed, to obtain a processed video frame corresponding to the video frame to be processed.

In a second aspect, the present disclosure further provides an apparatus for processing a video image. The apparatus includes: an attribute information determination module configured to determine attribute information of an object to be processed in a video frame to be processed; a datum display information determination module configured to determine datum display information of the object based on the attribute information of the object; and a processed video frame determination module configured to adjust, based on the datum display information, target display information of a mounted material in the video frame to be processed, to obtain a processed video frame corresponding to the video frame to be processed.

In a third aspect, the present disclosure further provides an electronic device. The electronic device includes: one or more processors; and a memory configured to store one or more programs, where the one or more programs, when executed by the one or more processors, cause the one or more processors to implement the method for processing a video image described above.

In a fourth aspect, the present disclosure further provides a non-transitory computer readable storage medium. The storage medium includes computer-executable instructions, where the computer-executable instructions, when executed by a computer processor, are configured to perform the method for processing a video image described above.

DETAILED DESCRIPTION OF EMBODIMENTS

Figure 1:
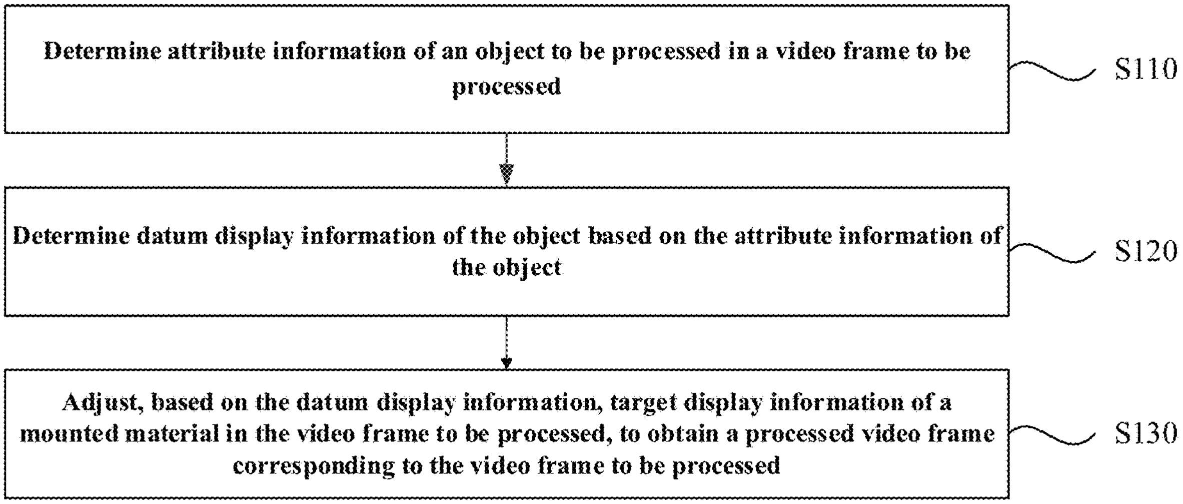
FIG. 1 is a schematic flowchart of a method for processing a video image according to Embodiment 1 of the present disclosure.

Embodiments of the present disclosure will be described below with reference to accompanying drawings. Although some embodiments of the present disclosure are shown in the accompanying drawings, the present disclosure can be implemented in various forms, and these embodiments are provided for understanding the present disclosure. The accompanying drawings and the embodiments of the present disclosure are merely illustrative.

A plurality of steps described in a method embodiment of the present disclosure can be executed in different orders and/or in parallel. Further, the method embodiment can include an additional step and/or omit a shown step, which does not limit the scope of the present disclosure.

As used herein, the terms “comprise” and “include” and their variations are open-ended, that is, “comprise but not limited to” and “include but not limited to”. The term “based on” indicates “at least partially based on”. The term “an embodiment” indicates “at least one embodiment”. The term “another embodiment” indicates “at least one another embodiment”. The term “some embodiments” indicates “at least some embodiments”. Related definitions of other terms will be given in the following description.

The concepts such as “first” and “second” mentioned in the present disclosure are merely used to distinguish different apparatuses, modules or units, rather than limit an order or interdependence of functions executed by these apparatuses, modules or units. It should be noted that modifications with “a”, “an” and “a plurality of” mentioned in the present disclosure are schematic rather than limitative, and should be understood by those skilled in the art as "one or more" unless otherwise indicated in the context.

Names of messages or information exchanged among a plurality of apparatuses in the embodiment of the present disclosure are merely used for illustration rather than limitation to the scope of the messages or information.

Before introducing a technical solution, an application scenario can be illustratively described at first. The technical solution of the present disclosure may be applied to any picture requiring effect display, for example, in a process of shooting a video. That is, during live stream, shot video frames may be uploaded to a server, and the server may execute the technical solution, so as to process an effect. Alternatively, after video shooting is completed, a corresponding effect may be added to each video frame in the video. In this technical solution, the effect added may be any effect.

This technical solution may be implemented by the server or a client, or through cooperation between the client and the server. For example, corresponding effects are added to corresponding video frames based on processing by the client. Alternatively, the video frames shot are uploaded to the server, and then send same downstream to the client after the server processes the video frames, and the client displays the video frames to which the effects are added.

Embodiment 1

FIG. 1 is a schematic flowchart of a method for processing a video image according to Embodiment 1 of the present disclosure. This embodiment of the present disclosure is applicable to any effect display or effect processing scenario supported by the Internet. The method is configured to adjust a size of an effect in a video frame to be processed, so as to achieve three-dimensional display of the effect. This method may be implemented through an apparatus for processing a video image. The apparatus may be implemented in the form of software and/or hardware, for example, an electronic device. The electronic device may be a mobile terminal or a personal computer (PC) terminal, a server, etc.

As shown in FIG. 1, the method includes: S110-S130.

S110. Attribute information of an object to be processed in a video frame to be processed is determined.

The effect is generally added to a target subject in the video. Accordingly, each video frame may include the target subject or not. If the target subject is included, the effect added to the target subject may be processed based on the technical solution.

The target subject may be the object to be processed. The object to be processed may be a person or thing whose content matches preset parameters. For example, if the preset parameter defines processing of a person in the video frame to be processed, the object to be processed may be a person, and the object to be processed may also be an object correspondingly. The attribute information may be feature information of the object to be processed. For example, the attribute information may be display size information of the object to be processed.

A user may shoot a target video including the object to be processed and upload the target video to a target client. After receiving the target video, the target client may add a corresponding effect to each video frame to be processed in the target video. The attribute information of the object to be processed may be obtained simultaneously. Thus, display information of the object to be processed in the video frame to be processed is adjusted, thereby achieving an effect of three-dimensional display.

In this embodiment, the step that attribute information of an object to be processed in a video frame to be processed is determined may include as follows: based on a two-dimensional (2D) point recognition algorithm, at least two points to be processed of the object to be processed in the video frame to be processed are determined. Coordinate information to be processed of the at least two points to be processed are determined, and the coordinate information to be processed is taken as the attribute information.

Figure 2:
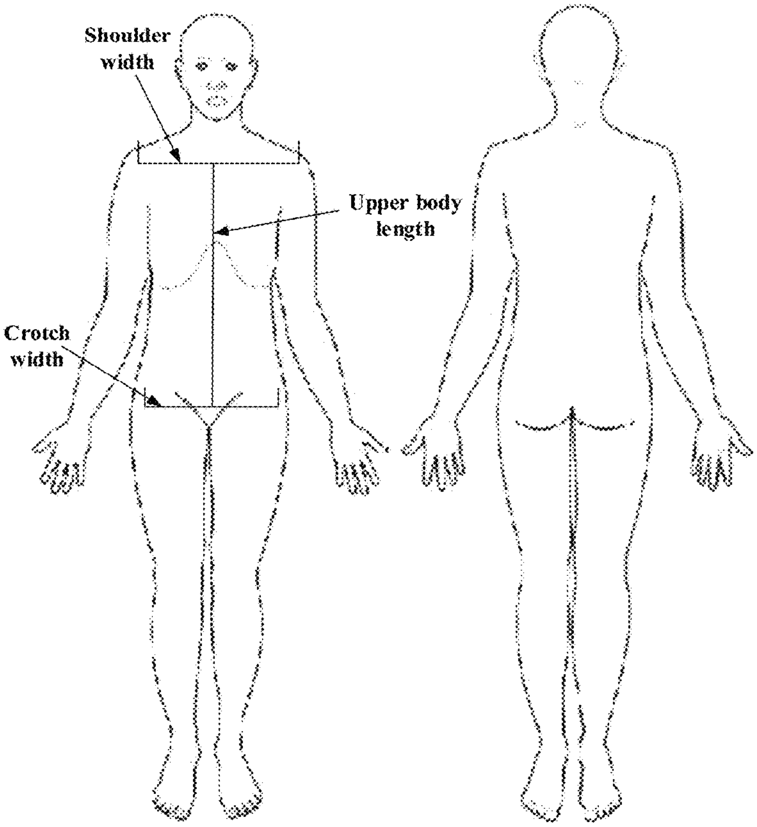
FIG. 2 is a schematic diagram of determining attribute information of an object to be processed according to Embodiment 1 of the present disclosure.

The 2D point recognition algorithm is configured to recognize a key limb point of the object to be processed. The key limb point recognized by this algorithm is accurate. Correspondingly, this algorithm is accurate when determining display information of a mounted material based on the accurate key limb point recognized. The at least two points to be processed correspond to the key limb points of the object to be processed. The key limb points may be key shoulder points, key crotch points and key neck points. Correspondingly, the points to be processed may be shoulder points, crotch points and neck points, as shown in FIG. 2. Each point has corresponding coordinates in the video frame to be processed. Such coordinates may be used as the coordinate information to be processed. For example, the coordinate information to be processed may be expressed by (u, v). The coordinate information to be processed of the point to be processed is taken as the attribute information.

In this embodiment, the step that attribute information of an object to be processed in a video frame to be processed is determined may further include as follows: bounding box information that includes the object to be processed in the video frame to be processed is determined, and the bounding box information is taken as the attribute information.

The bounding box may be a rectangular box, and an edge line of the rectangular box is tangent to an edge line of the object to be processed. The bounding box may be expressed by four vertex coordinates of the rectangular box. Correspondingly, the four vertex coordinates may be used as the attribute information of the bounding box information.

Figure 3:
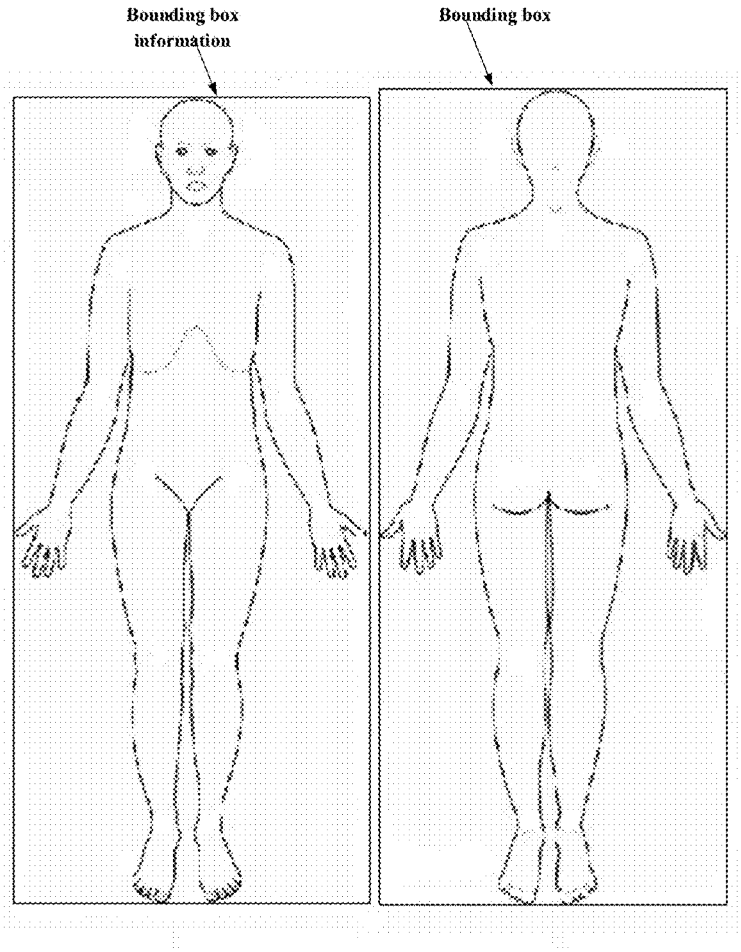
FIG. 3 is another schematic diagram of determining the attribute information of the object to be processed according to Embodiment 1 of the present disclosure.

Illustratively, when it is determined that the video frame to be processed includes the object to be processed, a rectangular bounding box that surrounds the object to be processed and is tangent to the edge line of the object to be processed may be determined according to pixel coordinates of the edge line of the object to be processed, as shown in FIG. 3. The pixel coordinates of four vertices of the rectangular bounding box may be used as the attribute information of the bounding box.

S120. Datum display information of the object is determined based on the attribute information of the object.

The datum display information may be display information, in the video frame to be processed, of the object to be processed. For example, the datum display information may be information such as a display size, a display proportion or a display angle of the object to be processed in the video frame to be processed.

The attribute information of the object to be processed may be used as the datum display information of the object to be processed. Alternatively, the attribute information may be processed to determine the datum display information. That is, the datum display information refers to relative display information, in the video frame to be processed, of the object to be processed. By determining the datum display information, effect display information in the video frame to be processed may be adjusted according to the display information, thereby achieving an effect of three-dimensional display.

In this embodiment, according to the coordinate information to be processed, at least three types of width information associated with the object to be processed are determined. In addition, the datum display information of the video frame to be processed is determined according to the at least three types of width information and corresponding preset datum values.

The at least three types of width information may include a shoulder width, an upper body length, and a crotch width. The shoulder width information is determined according to coordinate information to be processed of the key shoulder point. The upper body length information is determined according to an ordinate of the key crotch point and an ordinate of the key neck point. The crotch width information is determined according to coordinate information to be processed of the key crotch point. The preset datum value refers to a standard proportion of the shoulder width, the upper body length and the crotch width. The datum display information of the video frame to be processed may be determined based on the standard proportion and the at least three types of width information.

According to the coordinate information to be processed of each key point, the shoulder width, upper body length, and crotch width may be determined. Based on the above three values, the proportion may be determined. This proportion may be compared with a standard proportion in the preset datum value, and the datum display information of the video frame to be processed may be determined. Thus, the effect size information in the video frame to be processed is determined according to the datum display information, thereby achieving a presentation of effects in three-dimensional.

Illustratively, according to the coordinate information to be processed of each key point, the shoulder width X, the upper body length Y, and the crotch width Z may be determined. The standard datum proportions of three lengths are set (shoulder width:upper body length:crotch width=x:y:z). Then, three widths are converted into corresponding standard datum proportions, for example, the three widths are scaled according to the proportions. A maximum value is obtained from the proportions, and a proportion of this maximum value and the set standard datum value is computed. Thus, an effect material in the video frame to be processed is scaled up or down according to this proportion. In this embodiment, the three lengths are determined for solving the problem that length information changes greatly due to body rotation of the object to be processed. Thus, an effect determined matches an actual effect to the greatest extent.

That is, the step that datum display information of the video frame to be processed is determined according to the at least three types of width information and corresponding preset datum values may include: the maximum proportion is determined according to a proportion among the at least three types of width information, and the datum display information is determined according to a proportion of the maximum proportion to the preset standard datum value. The datum display information may be a scaling proportion of the effect.

In this embodiment, if the attribute information is the bounding box information, the datum display information is determined according to the bounding box information in the attribute information and page size information of a display page to which the video frame to be processed belongs.

A size of the bounding box, such as a length and a width of the bounding box, may be determined according to coordinate information to be processed of the four vertices in the bounding box information. At the same time, page size information of the display page when the video frame to be processed is played may be obtained. The page size information includes a page length and a page width. According to the length and width of the bounding box, an area of the bounding box may be determined. Correspondingly, an area of the page display may be determined according to the page length and the page width. By computing a proportion of the area of the bounding box to the area of the page display, the datum display information may be determined.

In this embodiment, if the attribute information is the bounding box information, proportion information of the object to be processed in the video to be processed is determined according to a near plane predetermined and the bounding box information, where the near plane is a plane determined under a condition that the object to be processed covers a display page to which the video frame to be processed belongs. In addition, the datum display information is determined according to distance information between the near plane and a virtual camera and the proportion information.

Figure 4:
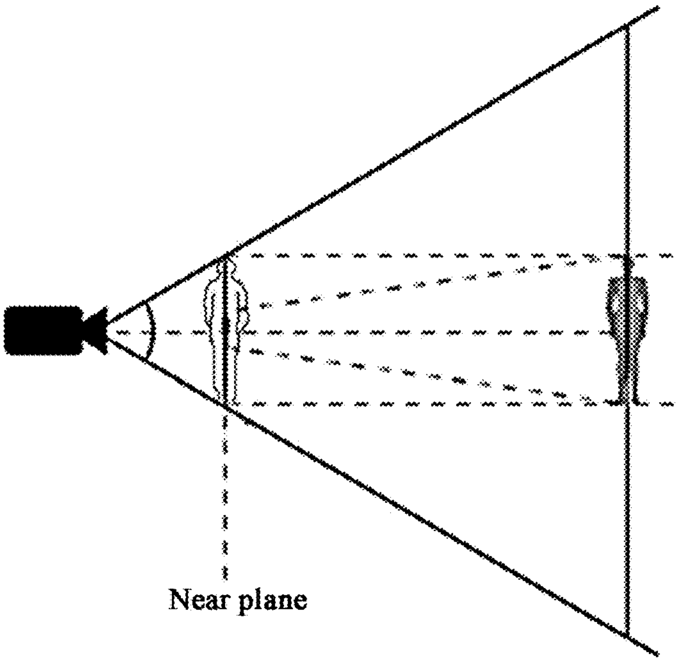
FIG. 4 is yet another schematic diagram of determining the attribute information of the object to be processed according to Embodiment 1 of the present disclosure.

When the virtual camera shoots the object to be processed, a plane corresponding to the object to be processed when the object to be processed covers an entire screen is taken as the near plane. It is assumed that a human body is closest to the virtual camera when the object to be processed, that is, the human body covers the entire screen, the distance between the near plane and the camera may be obtained according to a fov value in the virtual camera. When the human body is scaled down gradually, it means that the plane where the user is currently located gradually goes away from the camera. According to a theorem of similar triangles, a proportion of the distance between the near plane and the camera to a distance between the plane where the user is located and the camera is obtained, as shown in FIG. 4. This proportion may be used as the datum display information.

S130. Based on the datum display information, target display information of a mounted material in the video frame to be processed is adjusted, to obtain a processed video frame corresponding to the video frame to be processed.

The mounted material may be an effect material added to the video frame to be processed, for example, the effect material may be rabbit ears. The target display information is determined according to the datum display information. The target display information may be scaled-up or scaled-down display information of the mounted material. For example, the target display information may be scaled-up or scaled-down display size information of the mounted material.

After the datum display information is determined, the mounted material in the video frame to be processed may be scaled up or down according to the datum display information, and corresponding target display information is obtained. Then, the processed video frame is obtained based on the target display information. In the present disclosure, the processed video frame may also be referred to as a target video frame, and the present disclosure does not limit for this aspect. That is, the processed video frame (i.e., the target video frame) is a video frame obtained after the mounted material in the video frame to be processed is adjusted.

In this embodiment, the step that based on the datum display information, target display information of a mounted material in the video frame to be processed is adjusted, to obtain a processed video frame corresponding to the video frame to be processed includes:

Based on the datum display information, target display information of the mounted material is adjusted. The mounted material is processed based on the virtual camera and the target display information adjusted, and the processed video frame corresponding to the video frame to be processed is obtained.

The target display information may be display information of the mounted material in the video frame. For example, the datum display information may refer to a scaling-up value or a scaling-down value of the mounted material. Correspondingly, the target display information may refer to the display size information after the mounted material is scaled up or scaled down, or depth information, etc. of the mounted material. Based on the virtual camera and the target display information, the mounted material may be reconstructed, so as to obtain a corresponding processed video frame. The virtual camera includes at least one of a perspective camera and an orthogonal camera.

Illustratively, after the proportion of the distance between the near plane and the camera to the distance between the plane where the user is located and the camera is obtained, a center point of a follow-through material (the mounted material) may be scaled according to this proportion mainly because a point result of this proportion falls within a range from −1 to 1, which is just the case of the near plane. A size of the plane may be scaled up in the case of getting away from the camera, thus it is necessary to scale a position of the material with this proportion. Since the Z-value is changed to simulate a change in the mounted material following through the user in the scenario, it is necessary to use the perspective camera for rendering. It is clear that if after the key limb point is recognized based on the 2D point algorithm, or an area proportion is determined based on the bounding box information, the datum display information is determined and may be rendered based on the orthogonal camera, so as to obtain the processed video frame.

According to the technical solution of the embodiment of the present disclosure, the attribute information of the object to be processed in the video frame to be processed is determined. The datum display information of the object is determined based on the attribute information of the object. Based on the datum display information, the target display information of the mounted material in the video frame to be processed is adjusted, and the processed video frame corresponding to the video frame to be processed is obtained. Thus, the problem in the related art that when adopted for recognizing a key limb point, the 2D algorithm is poor in follow-through effect since three-dimensional information of the key limb point cannot be obtained despite the fact that the recognized key limb point is accurate is solved. The problem that when used for recognizing the key point, a 3D recognition algorithm is demanding in terms of terminal device performance as it is performance-consuming and poor in universality accordingly despite the fact that the three-dimensional information of the key limb point can be recognized is also solved. According to key limb information of the object to be processed in the video frame to be processed, the target display information of the mounted material can be determined according to the key limb point information, so as to implement three-dimensional display of the mounted material.

Embodiment 2

Figure 5:
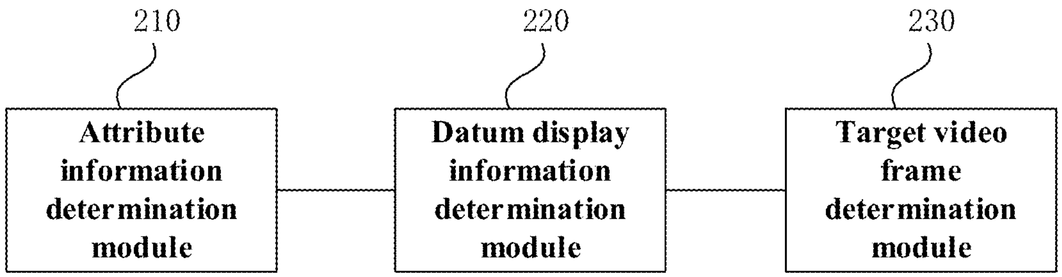
FIG. 5 is a schematic diagram of an apparatus for processing a video image according to Embodiment 2 of the present disclosure.

FIG. 5 is a schematic diagram of an apparatus for processing a video image according to Embodiment 2 of the present disclosure. As shown in FIG. 5, the apparatus includes: an attribute information determination module 210, a datum display information determination module 220, and a target video frame determination module 230.

The attribute information determination module 210 is configured to determine attribute information of an object to be processed in a video frame to be processed. The datum display information determination module 220 is configured to determine datum display information of the object based on the attribute information of the object. The target video frame determination module 230 is configured to adjust, based on the datum display information, target display information of a mounted material in the video frame to be processed, to obtain a processed video frame corresponding to the video frame to be processed.

Based on the technical solution described above, the attribute information determination module 210 includes: a point recognition unit, configured to determine, based on a two-dimensional (2D) point recognition algorithm, at least two points to be processed of the object to be processed in the video frame to be processed; and an attribute information determination unit, configured to determine coordinate information to be processed of the at least two points to be processed, and take the coordinate information to be processed as the attribute information.

Based on the technical solution described above, the datum display information determination module 220 includes: a width information determination unit, configured to determine, according to the coordinate information to be processed, at least three types of width information associated with the object to be processed; and a datum display information determination unit, configured to determine, according to the at least three types of width information and corresponding preset datum values, datum display information of the video frame to be processed.

Based on the technical solution described above, the attribute information determination module 210 includes: a bounding box information determination unit, configured to determine bounding box information that includes the object to be processed in the video frame to be processed, and take the bounding box information as the attribute information.

Based on the technical solution described above, the datum display information determination module 220 is further configured to: determine the datum display information according to the bounding box information in the attribute information and page size information of a display page to which the video frame to be processed belongs.

Based on the technical solution described above, the datum display information determination module 220 is further configured to: determine proportion information of the object to be processed in the video to be processed according to a near plane predetermined and the bounding box information, where the near plane is a plane determined under a condition that the object to be processed covers a display page to which the video frame to be processed belongs; and determine the datum display information according to distance information between the near plane and a virtual camera and the proportion information.

Based on the technical solution described above, the target video frame determination module 230 includes: a display unit, configured to display target display information of the mounted material based on the datum display information; and a target video frame determination unit, configured to process the mounted material based on the virtual camera and the target display information adjusted, and obtain the processed video frame corresponding to the video frame to be processed.

According to the technical solution of the embodiment of the present disclosure, the attribute information of the object to be processed in the video frame to be processed is determined. The datum display information of the object to be processed is determined based on the attribute information of the object. Based on the datum display information, the target display information of the mounted material in the video frame to be processed is adjusted, and the processed video frame corresponding to the video frame to be processed is obtained. Thus, the problem in the related art that when adopted for recognizing a key limb point, the 2D algorithm is poor in follow-through effect since three-dimensional information of the key limb point cannot be obtained despite the fact that the recognized key limb point is accurate is solved. The problem that when used for recognizing the key point, a 3D recognition algorithm is demanding in terms of terminal device performance as it is performance-consuming and poor in universality accordingly despite the fact that the three-dimensional information of the key limb point can be recognized is also solved. According to key limb information of the object to be processed in the video frame to be processed, the target display information of the mounted material can be determined according to the key limb point information, so as to implement three-dimensional display of the mounted material.

The apparatus for processing a video image according to the embodiment of the present disclosure may execute the method for processing a video image according to any embodiment of the present disclosure, and has corresponding functional modules and effects for executing the method.

A plurality of units and modules included in the apparatus described above are merely divided according to a functional logic, but are not limited to the above division, as long as the corresponding functions can be performed. In addition, names of the plurality of functional unit are merely for the convenience of mutual distinguishing rather than limitation to the protection scope of the example of the present disclosure.

Embodiment 3

Figure 6:
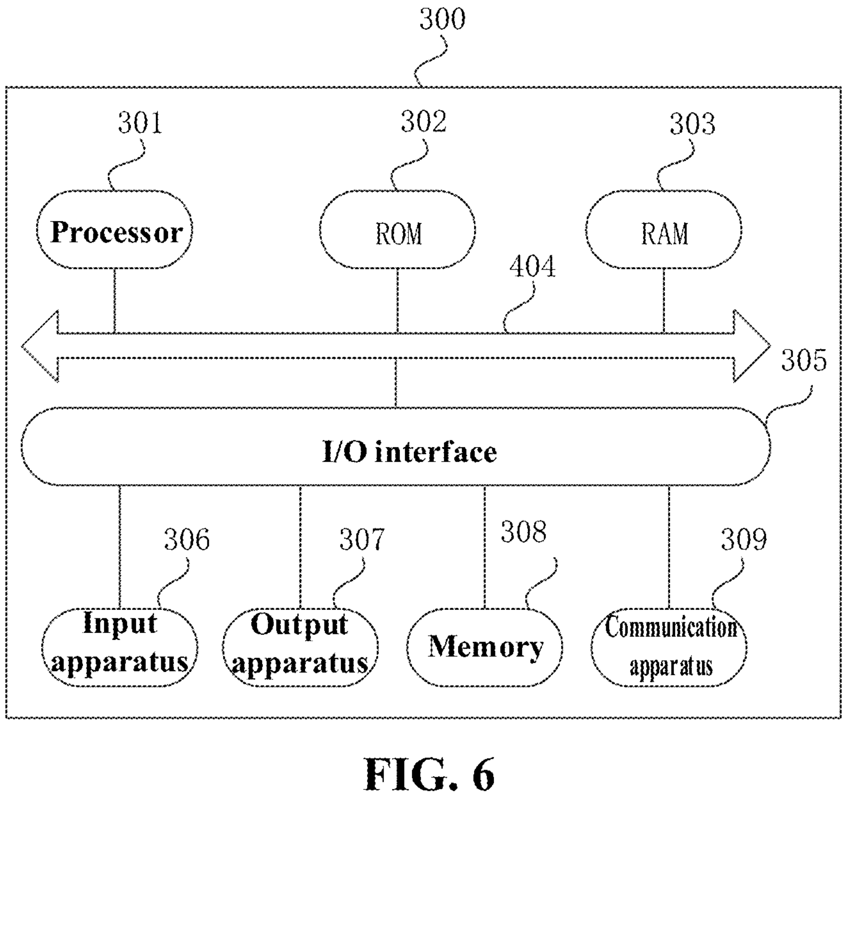
FIG. 6 is a schematic structural diagram of an electronic device according to Embodiment 3 of the present disclosure.

FIG. 6 is a schematic structural diagram of an electronic device according to Embodiment 3 of the present disclosure. With reference to FIG. 6, a schematic structural diagram of the electronic device 300 (for example, a terminal device or a server in FIG. 6) applied to implementation of the embodiment of the present disclosure is shown. The terminal device in the embodiment of the present disclosure may include, but are not limited to, a mobile terminal such as a mobile phone, a laptop, a digital broadcast receiver, a personal digital assistant (PDA), a portable android device (PAD), a portable media player (PMP) and a vehicle-mounted terminal (such as a vehicle-mounted navigation terminal), and a fixed terminal such as a digital television (TV) and a desktop computer. The electronic device 300 shown in FIG. 6 is merely an instance, and should not be constructed as limitation to functions and application scopes of the embodiment of the present disclosure.

As shown in FIG. 6, the electronic device 300 may include a processing apparatus 301 (including a central processing unit, a graphics processing unit, etc.) that may execute various appropriate actions and processing according to a program stored in a read-only memory (ROM) 302 or a program loaded from a memory 308 to a random access memory (RAM) 303. The RAM 303 may further store various programs and data required for the operation by the electronic device 300. The processing apparatus 301, the ROM 302, and the RAM 303 are connected to one another through a bus 304. An input/output (I/O) interface 305 is also connected to the bus 304.

Generally, the following apparatuses may be connected to the I/O interface 305: an input apparatus 306 including, for example, a touch screen, a touch pad, a keyboard, a mouse, a camera, a microphone, an accelerometer and a gyroscope, an output apparatus 307 including, for example, a liquid crystal display (LCD), a speaker and a vibrator, the memory 308 including, for example, a magnetic tape and a hard disk, and a communication apparatus 309. The communication apparatus 309 may allow the electronic device 300 to be in wireless or wired communication with other devices for data exchange. Although the electronic device 300 having various apparatuses is shown in FIG. 6, not all the apparatuses shown are required to be implemented or provided. More or fewer apparatuses may be alternatively implemented or provided.

According to the embodiment of the present disclosure, a process described above with reference to the flowchart may be implemented as a computer software program. For example, the embodiment of the present disclosure includes a computer program product. The computer program product includes a computer program carried on a non-transitory computer-readable medium, and the computer program includes program codes for executing the method shown in the flowchart. In such an embodiment, the computer program may be downloaded and installed from the network through the communication apparatus 309, or installed through the memory 308, or installed through the ROM 302. When executed by the processing apparatus 301, the computer program executes the above functions defined in the method according to the embodiment of the present disclosure.

Names of messages or information exchanged among a plurality of apparatuses in the embodiment of the present disclosure are merely used for illustration rather than limitation to the scope of the messages or information.

The electronic device according to the embodiment of the present disclosure belongs to the same concept as the method for processing a video image according to the above embodiment, reference can be made to the above embodiment for the technical details not described in detail in this embodiment, and this embodiment has the same effects as the above embodiment.

Embodiment 4

An embodiment of the present disclosure provides a computer storage medium. The computer storage medium stores a computer program, where the computer program implements the method for processing a video image according to the above embodiment when executed by a processor.

The computer-readable medium described above in the present disclosure may be a computer-readable signal medium or a computer-readable storage medium or their any combination. For example, the computer-readable storage medium may be, but are not limited to, an electric, magnetic, optical, electromagnetic, infrared, or semiconductor system, apparatus or device, or their any combination. More specific embodiments of the computer-readable storage medium may include, but are not limited to, an electrical connection with one or more wires, a portable computer disk, a hard disk, an RAM, an ROM, an erasable programmable read-only memory (EPROM or a flash memory), an optical fiber, a portable compact disk read only memory (CD-ROM), an optical storage device, a magnetic storage device, or their any suitable combination. In the present disclosure, the computer-readable storage medium may be any tangible medium including or storing a program, and the program may be used by or in combination with an instruction execution system, apparatus or device. In the present disclosure, the computer-readable signal medium may include a data signal propagated in a baseband or as part of a carrier wave, in which a computer-readable program code is carried. This propagated data signal may have a plurality of forms, including but not limited to an electromagnetic signal, an optical signal or their any suitable combination. The computer-readable signal medium may further be any computer-readable medium other than the computer-readable storage medium, and the computer-readable signal medium may send, propagate or transmit a program used by or in combination with the instruction execution system, apparatus or device. The program code included in the computer-readable medium may be transmitted by any suitable medium, including but not limited to: a wireless, wire, optical cable, radio (RF) medium, etc., or their any suitable combination.

In some embodiments, a client and a server may communicate by using any network protocol such as the hypertext transfer protocol (HTTP) that is currently known or will be developed in future, and may be interconnected to digital data communication in any form or medium (for example, a communication network). Instances of the communication network include a local area network (LAN), a wide area network (WAN), Internet work (for example, the Internet), an end-to-end network (for example, an ad hoc end-to-end network), and any network that is currently known or will be developed in future.

The computer-readable medium may be included in the electronic device, or exist independently without being fitted into the electronic device.

The computer-readable medium carries one or more programs, and when executed by the electronic device, the one or more programs cause the electronic device to: determine attribute information of an object to be processed in a video frame to be processed; determine datum display information of the object based on the attribute information of the object; and adjust, based on the datum display information, target display information of a mounted material in the video frame to be processed, to obtain a processed video frame corresponding to the video frame to be processed.

Computer program codes for executing the operations of the present disclosure may be written in one or more programming languages or their combinations, and the programming languages include, but are not limited to, object-oriented programming languages such as Java, Smalltalk and C++, and further include conventional procedural programming languages such as "C" language or similar programming languages. The program codes may be completely executed on a computer of the user, partially executed on the computer of a user, executed as an independent software package, partially executed on the computer of the user and a remote computer separately, or completely executed on the remote computer or the server. In the case of involving the remote computer, the remote computer may be connected to the computer of the user through any type of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various embodiments of the present disclosure. In this regard, each block in the flowchart or block diagram may represent one module, one program segment, or a part of codes that includes one or more executable instructions for implementing specified logical functions. It should also be noted that in some alternative implementations, the functions indicated in the blocks may occur in an order different than those indicated in the accompanying drawings. For example, two blocks indicated in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by a specific hardware-based system that executes specified functions or operations, or may be implemented by a combination of specific hardware and computer instructions.

The units involved in the embodiment of the present disclosure may be implemented by software or hardware. A name of the unit does not constitute limitation to the unit itself in some cases. For example, a first obtainment unit may also be described as "a unit that obtains at least two Internet protocol addresses".

The functions described above herein may be executed at least in part by one or more hardware logic components. For example, usable hardware logic components of demonstration types include a field programmable gate array (FPGA), an application specific integrated circuit (ASIC), application specific standard parts (ASSP), a system on chip (SOC), a complex programmable logic device (CPLD), etc. in a non-restrictive way.

In the context of the present disclosure, a machine-readable medium may be a tangible medium, and may include or store a program that is used by or in combination with the instruction execution system, apparatus or device. The machine-readable medium may be a machine-readable signal medium or a machine-readable storage medium. The machine-readable medium may include, but is not limited to, an electric, magnetic, optical, electromagnetic, infrared, or semiconductor system, apparatus or device, or their any suitable combination. An instance of the machine-readable storage medium may include an electrical connection based on one or more wires, a portable computer disk, a hard disk, an RAM, an ROM, an EPROM or a flash memory, an optical fiber, a CD-ROM, an optical storage device, a magnetic storage device, or their any suitable combination.

According to one or more embodiments of the present disclosure, [Example 1] provides a method for processing a video image. The method includes: determining attribute information of an object to be processed in a video frame to be processed; determining datum display information of the object based on the attribute information of the object; and adjusting, based on the datum display information, target display information of a mounted material in the video frame to be processed, to obtain a processed video frame corresponding to the video frame to be processed.

According to one or more embodiments of the present disclosure, [Example 2] provides the method for processing a video image. The method further includes: the determining attribute information of the object to be processed in the video frame to be processed comprises: determining, based on a 2D point recognition algorithm, at least two points to be processed of the object to be processed in the video frame to be processed; and determining coordinate information to be processed of the at least two points to be processed, and taking the coordinate information to be processed as the attribute information.

According to one or more embodiments of the present disclosure, [Example 3] provides the method for processing a video image. The method further includes: the determining datum display information of the object based on the attribute information of the object comprises: determining, according to the coordinate information to be processed, at least three types of width information associated with the object to be processed; and determining, according to the at least three types of width information and corresponding preset datum values, the datum display information of the video frame to be processed.

According to one or more embodiments of the present disclosure, [Example 4] provides the method for processing a video image. The method further includes: the determining attribute information of the object to be processed in the video frame to be processed comprises: determining bounding box information that comprises the object to be processed in the video frame to be processed, and taking the bounding box information as the attribute information.

According to one or more embodiments of the present disclosure, [Example 5] provides the method for processing a video image. The method further includes: the determining datum display information of the object based on the attribute information of the object comprises: determining the datum display information according to the bounding box information in the attribute information and page size information of a display page to which the video frame to be processed belongs.

According to one or more embodiments of the present disclosure, [Example 6] provides the method for processing a video image. The method further includes: the determining datum display information of the object based on the attribute information of the object comprises: determining proportion information of the object to be processed in the video to be processed according to a near plane predetermined and the bounding box information, wherein the near plane is a plane determined under a condition that the object to be processed covers a display page to which the video frame to be processed belongs; and determining the datum display information according to distance information between the near plane and a virtual camera and the proportion information.

According to one or more embodiments of the present disclosure, [Example 7] provides the method for processing a video image. The method further includes: the adjusting, based on the datum display information, the target display information of the mounted material in the video frame to be processed, to obtain the processed video frame corresponding to the video frame to be processed comprises: adjusting the target display information of the mounted material according to the datum display information; and processing the mounted material based on a virtual camera and the adjusted target display information, to obtain the processed video frame corresponding to the video frame to be processed.

According to one or more embodiments of the present disclosure, [Example 8] provides an apparatus for processing a video image. The apparatus includes: an attribute information determination module, configured to determine attribute information of an object to be processed in a video frame to be processed; a datum display information determination module, configured to determine datum display information of the object based on the attribute information of the object; and a target video frame determination module, configured to adjust, based on the datum display information, target display information of a mounted material in the video frame to be processed, to obtain a processed video frame corresponding to the video frame to be processed.

In addition, although a plurality of operations are depicted in a particular order, it should not be understood that these operations are required to be executed in the particular order shown or in a sequential order. In certain circumstances, multi-task and parallel processing may be advantageous. Similarly, although a plurality of implementation details are included in the discussion described above, these details should not be construed as limitation to the scope of the present disclosure. Some features described in the context of a separate embodiment can be further implemented in a single embodiment in a combination manner. On the contrary, various features described in the context of the single embodiment can be further implemented in a plurality of embodiments separately or in any suitable sub-combination manner.

We claim:

1. A method for processing a video image, comprising:

determining attribute information of an object in a video frame, wherein determining the attribute information of the object comprises determining bounding box information that comprises the object in the video frame as the attribute information;

determining datum display information of the object based on the attribute information of the object, wherein determining the datum display information of the object comprises:

determining proportion information of the object in the video according to a near plane and the bounding box information, wherein the near plane is a plane determined under a condition that the object covers a display page to which the video frame belongs, and determining the datum display information according to distance information between the near plane and a virtual camera and the proportion information; and adjusting, based on the datum display information, target display information of a mounted material in the video frame to obtain a processed video frame.

2. The method according to claim 1, wherein the determining attribute information of the object in the video frame comprises:

determining, based on a two-dimensional (2D) point recognition algorithm, at least two points of the object in the video frame; and determining coordinate information of the at least two points, and taking the coordinate information as the attribute information.

3. The method according to claim 2, wherein the determining datum display information of the object based on the attribute information of the object comprises:

determining, according to the coordinate information, at least three types of width information associated with the object; and determining, according to the at least three types of width information and corresponding preset datum values, the datum display information of the video frame.

4. The method according to claim 1, wherein the determining datum display information of the object based on the attribute information of the object comprises:

determining the datum display information according to the bounding box information in the attribute information and page size information of a display page to which the video frame belongs.

5. The method according to claim 1, wherein the adjusting, based on the datum display information, the target display information of the mounted material in the video frame, to obtain the processed video frame corresponding to the video frame comprises:

adjusting the target display information of the mounted material according to the datum display information; and processing the mounted material based on the virtual camera and the adjusted target display information to obtain the processed video frame.

6. An electronic device, comprising:

at least one processor;

a memory storing at least one program, wherein the at least one program, when executed by the at least one processor, causes the at least one processor to:

determine attribute information of an object in a video frame, wherein determining the attribute information of the object comprises determining bounding box information that comprises the object in the video frame as the attribute information;

determine datum display information of the object based on the attribute information of the object, wherein determining the datum display information of the object comprises:

determining proportion information of the object in the video according to a near plane and the bounding box information, wherein the near plane is a plane determined under a condition that the object covers a display page to which the video frame belongs, and determining the datum display information according to distance information between the near plane and a virtual camera and the proportion information; and adjust, based on the datum display information, target display information of a mounted material in the video frame to obtain a processed video frame.

7. The device according to claim 6, wherein the at least one processor is caused to:

determine, based on a two-dimensional (2D) point recognition algorithm, at least two points of the object in the video frame; and determine coordinate information of the at least two points, and taking the coordinate information as the attribute information.

8. The device according to claim 7, wherein the at least one processor is caused to:

determine, according to the coordinate information, at least three types of width information associated with the object; and determine, according to the at least three types of width information and corresponding preset datum values, the datum display information of the video frame.

9. The device according to claim 6, wherein the at least one processor is caused to:

determine the datum display information according to the bounding box information in the attribute information and page size information of a display page to which the video frame belongs.

10. The device according to claim 6, wherein the at least one processor is caused to:

adjust the target display information of the mounted material according to the datum display information; and process the mounted material based on the virtual camera and the adjusted target display information to obtain the processed video frame.

11. A non-transitory computer readable storage medium, comprising computer-executable instructions which, when executed by a computer processor, cause the computer processor to perform operations comprising:

determining attribute information of an object in a video frame, wherein determining the attribute information of the object comprises determining bounding box information that comprises the object in the video frame as the attribute information;

determining datum display information of the object based on the attribute information of the object, wherein determining the datum display information of the object comprises:

determining proportion information of the object in the video according to a near plane and the bounding box information, wherein the near plane is a plane determined under a condition that the object covers a display page to which the video frame belongs, and determining the datum display information according to distance information between the near plane and a virtual camera and the proportion information; and adjusting, based on the datum display information, target display information of a mounted material in the video frame to obtain a processed video frame.

12. The non-transitory computer readable storage medium according to claim 11, wherein the operations comprise:

determining, based on a two-dimensional (2D) point recognition algorithm, at least two points of the object in the video frame; and determining coordinate information of the at least two points, and taking the coordinate information as the attribute information.

13. The non-transitory computer readable storage medium according to claim 12, wherein the operations comprise:

determining, according to the coordinate information, at least three types of width information associated with the object; and determining, according to the at least three types of width information and corresponding preset datum values, the datum display information of the video frame.

14. The non-transitory computer readable storage medium according to claim 11, wherein the operations comprise:

determining the datum display information according to the bounding box information in the attribute information and page size information of a display page to which the video frame belongs.

15. The non-transitory computer readable storage medium according to claim 11, wherein the operations comprise:

adjusting the target display information of the mounted material according to the datum display information; and processing the mounted material based on the virtual camera and the adjusted target display information to obtain the processed video frame.

* * * * *